United States Patent
Ye et al.

(10) Patent No.: US 10,533,538 B2
(45) Date of Patent: Jan. 14, 2020

(54) COOLING DEVICE FOR COMPONENTS OF WIND TURBINES

(71) Applicant: ALAZ-ARIMA, S.L., Noain (Navarra) (ES)

(72) Inventors: Zheng Ye, Tianjin (CN); Juan Jose Aguas Alcalde, Pamplona (ES); Leire Hurtado Garcia, Pamplona (ES); Adolfo Azcarate Azcona, Valtierra (ES)

(73) Assignee: ALAZ-ARIMA, S.L., Noain (Navarra) (ES)

( * ) Notice: Subject to any disclaimer, the term of this patent is extended or adjusted under 35 U.S.C. 154(b) by 0 days.

(21) Appl. No.: 16/064,877

(22) PCT Filed: Dec. 20, 2016

(86) PCT No.: PCT/ES2016/070914
§ 371 (c)(1),
(2) Date: Jun. 21, 2018

(87) PCT Pub. No.: WO2017/109254
PCT Pub. Date: Jun. 29, 2017

(65) Prior Publication Data
US 2019/0024641 A1    Jan. 24, 2019

(30) Foreign Application Priority Data
Dec. 23, 2015    (ES) .............................. 201531430 U

(51) Int. Cl.
*F03D 9/00*    (2016.01)
*H02P 9/04*    (2006.01)
(Continued)

(52) U.S. Cl.
CPC .............. *F03D 80/60* (2016.05); *F03D 80/88* (2016.05); *F05D 2220/76* (2013.01); *F05D 2260/205* (2013.01); *F28D 15/0266* (2013.01)

(58) Field of Classification Search
CPC .................................. F03D 80/60; F03D 80/88
See application file for complete search history.

(56) References Cited

U.S. PATENT DOCUMENTS 7,615,884 B2 *   11/2009   McMaster ................. F03D 9/00
                                                            290/55
7,967,550 B2 *   6/2011    Grevsen .................... F03D 9/32
                                                            415/1
(Continued)

FOREIGN PATENT DOCUMENTS

CN       101338732 A      1/2009
CN       102777581 A      11/2012

OTHER PUBLICATIONS

International Search Report dated Mar. 27, 2017 for PCT/ES2016/070914 and English translation.

*Primary Examiner* — Tulsidas C Patel
*Assistant Examiner* — Thomas K Quigley
(74) *Attorney, Agent, or Firm* — Lucas & Mercanti, LLP

(57) ABSTRACT

A cooling device for components of wind turbines, comprising at least one conduit (3) containing therein a working fluid (5) selected to change from a liquid to gas phase, and vice versa, during operation; wherein a first lower portion of each conduit (3) is inserted into a receptacle (2) through which a primary coolant fluid (10) transporting heat from a component of a wind turbine to be cooled (7) circulates, said lower portion acting as an evaporator of the working fluid (5); and wherein a second upper portion of each conduit (3) remains outside the receptacle (2), acting as a condenser of the working fluid (5).

21 Claims, 4 Drawing Sheets

(51) Int. Cl.
*F03D 80/60* (2016.01)
*F03D 80/80* (2016.01)
*F28D 15/02* (2006.01)

(56) References Cited

U.S. PATENT DOCUMENTS

| | | | | |
|---|---|---|---|---|
| 8,052,383 B2 * | 11/2011 | Frokjaer | ............ | H05K 7/20927 415/178 |
| 8,585,358 B2 * | 11/2013 | Matsuo | ................... | F03D 80/88 415/176 |
| 8,640,478 B2 * | 2/2014 | Kim | .......................... | F03D 1/00 62/259.1 |
| 8,829,700 B2 * | 9/2014 | Wong | ...................... | F03D 80/60 290/44 |
| 8,938,967 B2 * | 1/2015 | McMaster | ................. | F03D 9/10 60/698 |
| 9,091,249 B2 * | 7/2015 | Sabhapathy | ............ | F03D 80/88 |
| 9,127,648 B2 * | 9/2015 | Sabhapathy | ............ | F03D 80/80 |
| 10,104,814 B2 * | 10/2018 | Wagoner | ................ | H05K 7/203 |
| 2008/0298964 A1 * | 12/2008 | Rimmen | ................... | F03D 9/25 416/39 |
| 2008/0307817 A1 * | 12/2008 | Roesner | .................. | F28D 15/00 62/259.2 |
| 2009/0320477 A1 * | 12/2009 | Juchymenko | ......... | F01K 23/065 60/651 |
| 2012/0001436 A1 * | 1/2012 | Sami | ........................ | F01K 7/22 290/55 |
| 2012/0124984 A1 * | 5/2012 | Akashi | ...................... | F03D 9/28 60/398 |
| 2012/0235419 A1 * | 9/2012 | Huang | .................... | F03D 80/80 290/55 |
| 2014/0138236 A1 * | 5/2014 | White | ................... | B01D 5/0006 202/185.3 |
| 2018/0156119 A1 * | 6/2018 | Menheere | ................ | F02C 7/16 |
| 2019/0008078 A1 * | 1/2019 | Waddell | ............... | F28D 15/0266 |

* cited by examiner

COOLING DEVICE FOR COMPONENTS OF WIND TURBINES

CROSS REFERENCE TO RELATED APPLICATION

This Application is a 371 of PCT/ES2016/070914 filed on Dec. 20, 2016, which, in turn, claimed the priority of Spanish Patent Application No. U 201531430 filed on Dec. 23, 2015, both applications are incorporated herein by reference.

FIELD OF THE ART

The present invention belongs to cooling systems for cooling components of wind turbines.

STATE OF THE ART

Different pieces of heat-generating equipment work simultaneously during the operation of a wind turbine.

Some of them such as the generator, the multiplier, the transformer, the hydraulic unit, the nacelle, etc. require a cooling system to keep their temperature within their range of operation.

Usually, heat cannot be discharged at the point where it is generated and must be transferred to another more convenient location for dissipation. This transport of the heat generated to the discharge point is performed by means of a hydraulic circuit made up of: a recirculation pump, a heat exchanger, ducts, hydraulic connections, a transport fluid, etc.

For example, the multiplier in some wind turbines is cooled by means of a dual hydraulic circuit. The oil from the multiplier circulates through the primary circuit where it is passed through an oil/water-glycol exchanger. This exchanger transfers heat from the oil to water-glycol. Water-glycol circulates through the secondary circuit driven by an additional pump to another water-glycol/air exchanger, where the heat is transferred to the outside air through the action of a motor fan.

The fact of having so many components reduces assembly reliability by increasing their possibility of malfunction.

On the other hand, these hydraulic circuits and their components take up a large volume and they are not always readily accessible.

Furthermore, the need of having to circulate a secondary fluid to perform heat transport leads to the probability of leakages in various connections of the hydraulic circuit. At times these leakages cause major breakdowns which may cause the wind turbine to go out of service for several days.

Additionally, the electric consumption of the components of these systems, the total sum of which may reach a large number of kilowatts, decreases total energy production and thereby wind turbine performance.

Other components of the wind turbine, like the nacelle itself, are cooled by introducing outside air that has been previously filtered and dehumidified to prevent corrosion. To that end, the action of one or more motor fans connected to the filtration and moisture elimination system is required.

These filtration systems are particularly complex in off-shore locations, desserts, environments with large airborne particles, etc. Furthermore, they require regular maintenance for replacing the filtering means.

OBJECT OF THE INVENTION

The object of the invention is a device for discharging heat generated by various components of an onshore, off-shore, or underwater wind turbine. The device comprises at least one preferably tubular conduit extending from a receptacle, through which the primary fluid transporting heat from the component to be cooled to the discharge point in contact with the outside air.

Said conduit contains therein a working fluid selected to change from a liquid to gas phase, and vice versa, during operation, thereby transporting heat from one point to another in a passive manner without requiring an additional drive pump. A first lower portion of each conduit is inserted into the receptacle, said lower portion acting as an evaporator of the working fluid. A second upper portion of each conduit remains outside the receptacle, in contact with the outside air, acting as a condenser of the working fluid.

For example, when cooling the multiplier of the wind turbine, the primary circuit would be connected to the receptacle of the device object of the invention. The oil would be in contact with a first lower portion of each conduit, acting as an evaporator of the working fluid and thereby transporting heat to a second upper portion of each conduit, located outside the receptacle in contact with the outside air, acting as a condenser. The heat from the oil can therefore be transferred to the outside air, eliminating the oil/water-glycol exchanger and the secondary circuit: drive pump, water-glycol/air exchanger, motor fan, connections, etc.

The proposed solution simplifies the cooling system by eliminating components and therefore increasing assembly reliability.

This simplification is of special interest in offshore locations where accessibility is not always assured and redundant systems have to be installed in some cases.

The space required for cooling is significantly reduced by eliminating the pump and the exchanger which are usually bulky elements.

On the other hand, by reducing the hydraulic connections between the different components of the system, the possibility of leakages therein, and therefore the possibility of malfunctions, costly breakdowns, and long machine downtimes, is significantly reduced.

Finally, it must be pointed out that the transport of heat from the primary fluid to the outside air is performed by means of phase change of the working fluid contained in the conduits, and by the effect of gravity without external power supply from a drive pump being necessary.

The device object of the invention can be applied to different components of the wind turbine, adding additional advantages to those that have been mentioned previously. For example, when cooling the nacelle described above, the device object of the invention would allow eliminating filtration systems as it completely isolates the inside of the nacelle from the outside air. In this solution, the receptacle of the device would be the nacelle itself, on the inside of which there would be inserted a first lower portion of each conduit, acting as an evaporator of the working fluid and thereby transporting heat from the inside air to a second upper portion of each conduit located outside the nacelle acting as a condenser.

In this solution, as mentioned, the filtration systems and therefore their maintenance are eliminated.

The cooling device of the present invention can be applied to onshore wind turbines, offshore wind turbines, and also to underwater wind turbines (submerged wind turbines that work underwater, utilizing water currents). While the condensers of the conduits are in contact with the outside air in the onshore and offshore wind turbines, in underwater wind turbines the condensers are in contact with the water outside.

In a possible embodiment, the cooling device comprises a receptacle connected to the component of the wind turbine to be cooled, with a recirculation pump for recirculating a primary coolant fluid. In this case, the cooling device preferably comprises ducts through which the primary coolant fluid circulates from and to the receptacle and the component of the wind turbine to be cooled. The component of the wind turbine to be cooled can be, for example, any one of the following elements:

The generator of the wind turbine.
The multiplier of the wind turbine.
The transformer of the wind turbine, in the case of an oil-cooled transformer.
The control electronics of a power converter of the wind turbine.
etc.

In another possible embodiment, the receptacle is the component of the wind turbine to be cooled. The receptacle can be in this case, for example, any one of the following components to be cooled:

The nacelle of the wind turbine.
The compartment of a transformer of the wind turbine.
The receptacle of a hydraulic unit of the wind turbine.
Ducts through which the primary fluid circulates.
etc.

In a preferred embodiment, the second upper portion of each conduit projects from the roof of the nacelle of the wind turbine, the cooling device having a nozzle responsible for housing the upper portion of each conduit and increasing the speed of the outer fluid.

In a possible embodiment, the first lower portion of the conduits extends, forming a chamber common to several conduits. The second upper portion of the conduits can also extend, forming a chamber common to several conduits.

In another possible embodiment, the conduit is sealed at one end, or even at both ends.

Optionally, the device comprises at least two conduits, where each conduit is sealed at both ends, and where the working fluid contained in each conduit has a different boiling point.

When the conduits comprised in the cooling device are at least two in number, each with both ends sealed, the working fluids contained in the conduits have a different boiling point. In other words, they change from a liquid to gas phase, and vice versa, at a different temperature. That is particularly relevant when a primary fluid such as oil is to be cooled, which, if cooled excessively loses fluidity and is less efficient. Using different working fluids with different boiling points keeps the primary fluid within its optimum range of operation.

The cooling device may comprise at least one hermetic seal to assure leak-tightness between the receptacle and at least one conduit. This hermetic seal can be flexible such that it allows immediately adjusting the height or axial displacement of the conduits, in addition to a very quick assembly.

The working fluid inside the conduit is preferably subjected to a pressure greater than the atmospheric pressure.

The cooling device may comprise a plurality of fins coupled to the second portion of the conduit. The fins may include an upper seal of the conduit. The fins are preferably metal fins. The cooling device may comprise the plurality of fins coupled to the first portion of the conduit additionally and alternatively to the coupling thereof to the second portion of the conduit. The contact surface and heat transfer in the first portion of the conduit are therefore increased.

Optionally, the conduits comprise end segments made of a metal material and an intermediate segment made of a flexible and electrically insulating material. The conduits can be made of a flexible or malleable material. For example, the conduits can be a flexible plastic material; this provides two significant advantages, on one hand, plastic is an electrically insulating material which prevents possible electric leakages of the element to be cooled, and on the other hand, greater flexibility is provided to the cooling device during installation; i.e., making it possible to place same in spaces in which it would be impossible to place rigid or non-flexible conduits due to the dimensions or configuration of the spaces for installing the devices, for example.

DESCRIPTION OF THE DRAWINGS

The invention will be described below in more detail in reference to the attached drawings in which.

DETAILED DESCRIPTION OF THE INVENTION

The object of the invention is a device for discharging heat generated by various components of a wind turbine. The device comprises one or more conduits extending from a receptacle through which the primary fluid transporting heat from the component to be cooled to the discharge point in contact with the outside air circulates. Said conduits contain therein a working fluid which undergoes a phase change, transporting heat from one point to another.

The component to be cooled (7) has no heat spot concentrated in a single element, and it is therefore advisable to concentrate it so as to be discharged by means of a primary coolant fluid (10). This fluid can be, for example: air, water, a mixture of water and glycol, oil, etc. Ducts (9) through which the primary fluid (10) circulates driven by means of a recirculation pump for recirculating the fluid are arranged between the component to be cooled (7) and the receptacle (2). These ducts can be, for example, tubings, pipes, hydraulic connections, air ducts, openings for communication between the component and the receptacle, etc.

Figure 1A:
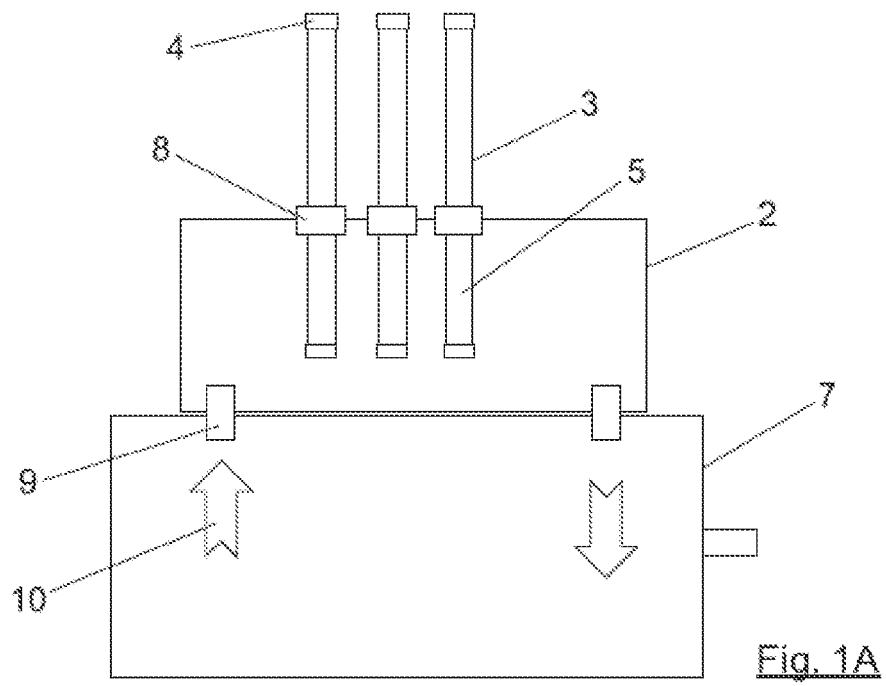
FIGS. 1A and 1B show a diagram depicting the cooling device in which the receptacle through which the primary fluid circulates and the conduit extending to the heat discharge point are seen.
Figure 1B:
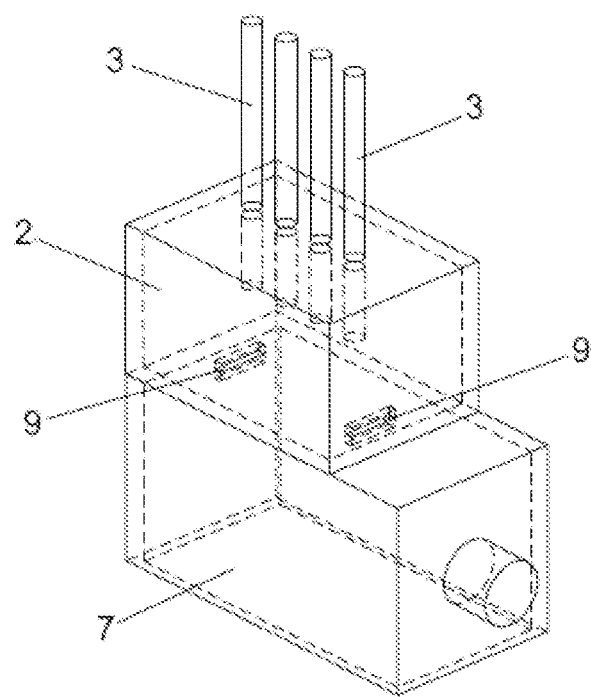

In the embodiment of the invention shown in FIGS. 1A (schematic side view) and 1B (schematic perspective view), the component to be cooled (7) is connected to a receptacle (2) into which at least one preferably tubular-shaped conduit (3) is inserted.

A working fluid (5) performs a phase change-based thermodynamic cycle inside the conduit. The lower part of the conduit (3) (referred to as evaporator) receives the heat to be dissipated and the fluid in liquid phase evaporates and transforms into vapor. Due to the difference in densities existing between the liquid and vapor state of all fluid, said vapor moves upward to the higher and colder part of the conduit (3) (referred to as condenser) where it condenses, giving off latent heat, and again moving downward by gravity to the lower part. The working fluid (5) repeats this cycle over and over again, a quick heat transfer in one direction from top to bottom thus being obtained.

The dimensions of the receptacle (2) as well as the dimensions of the conduit (3) will be adapted according to the power to be dissipated and the environmental conditions of the surroundings.

Figure 2A:
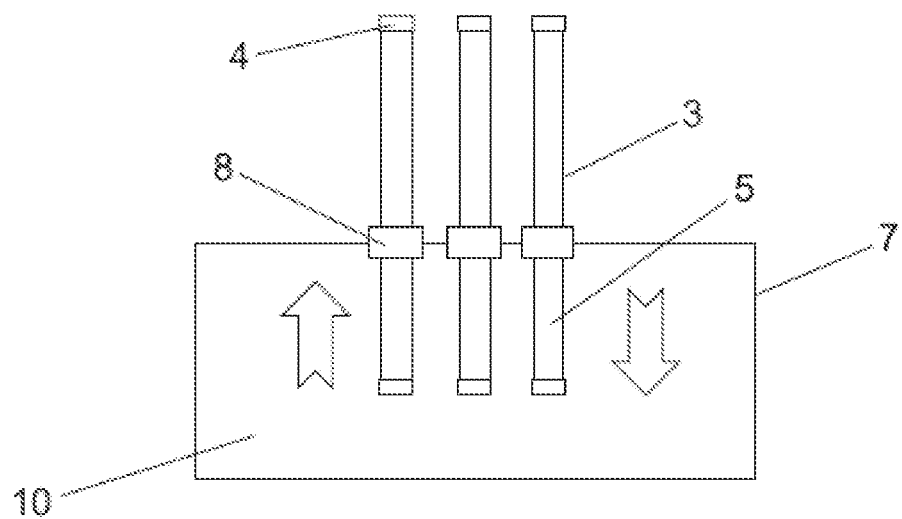
FIGS. 2A and 2B show an alternative embodiment of the cooling device in which the receptacle is the component to be cooled itself.
Figure 2B:
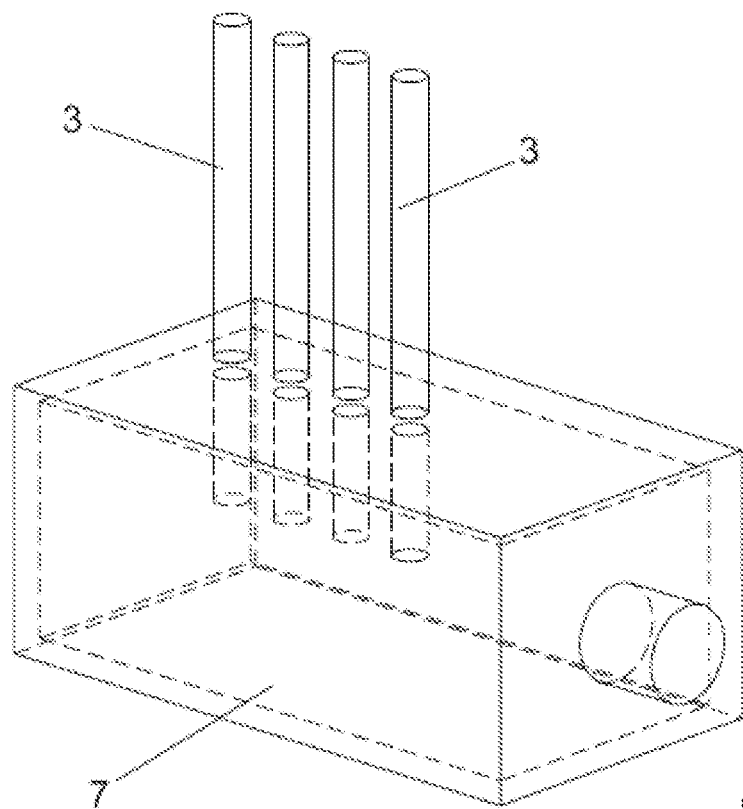

Optionally, as shown in FIGS. 2A (schematic side view) and 2B (schematic perspective view), the receptacle (2) can be the component to be cooled (7) itself: the nacelle itself, the compartment of the transformer, the receptacle of the hydraulic unit, the ducts through which the primary fluid circulates, etc.

The conduit (3) is selected for each application based on its fundamental parameters: material, thickness, length, etc. The material can be copper, for example.

The working pressure of the conduit (3) must also be considered when determining the material and the thickness so that there will be no deformations which may reduce heat transfer.

The first hermetic seal (4) at the end of the conduit (3) assures leak-tightness of the conduit to the selected design conditions. Seals made by compression, hydraulic seals, seals with epoxy resins, etc. can be used, for example.

A second hermetic seal (8) allows assuring leak-tightness between the receptacle (2) and the conduit (3) to prevent the leakage of the primary fluid (10). A sealing gasket, hydraulic seal, weld, etc. can be used, for example. The second hermetic seal (8) can be a flexible seal such that it allows immediately adjusting the height or axial displacement of the conduits (3), in addition to a very quick assembly.

The working fluid (5) can be a coolant fluid, for example, R-134-a or the like.

Figure 3:
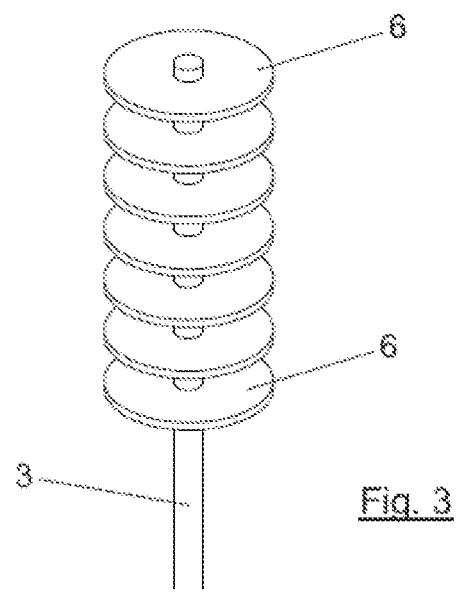
FIG. 3 depicts a detail of the end of a conduit with fins.

FIG. 3 shows a possible embodiment of the part of the condenser of the conduit (3) where metal fins (6) are installed for the purpose of making more surface available for heat exchange between the conduit itself and the outside air. Said fins (6) can be, for example, corrugated metal plates or flat discs inserted, welded, or embedded in the conduit itself, arranged horizontally, vertically, in a spiral, etc. The main function of these fins (6) is to increase the surface for passive heat transfer with respect to the air.

Alternatively, the fins can be built as a single assembly and with different shapes. In this case, the conduit (3) can be sealed against this assembly which would perform the function of a condenser.

The cooling device may comprise the fins (6) coupled to the first portion of the conduits (3) additionally and alternatively to the coupling of the fins (6) to the second portion of the conduit. With the coupling of the fins (6) to the first portion of the conduits (3), the contact surface and thereby heat transfer are increased.

Figure 4A:
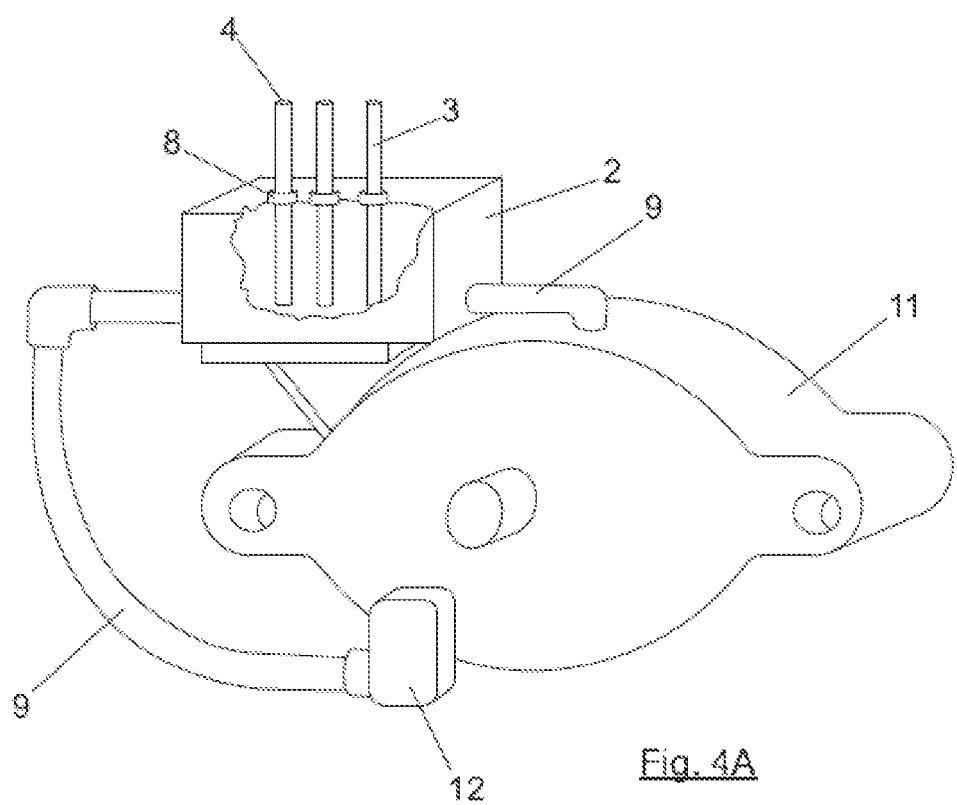
FIGS. 4A and 4B depict the cooling device applied for cooling different components of a wind turbine.
Figure 4B:
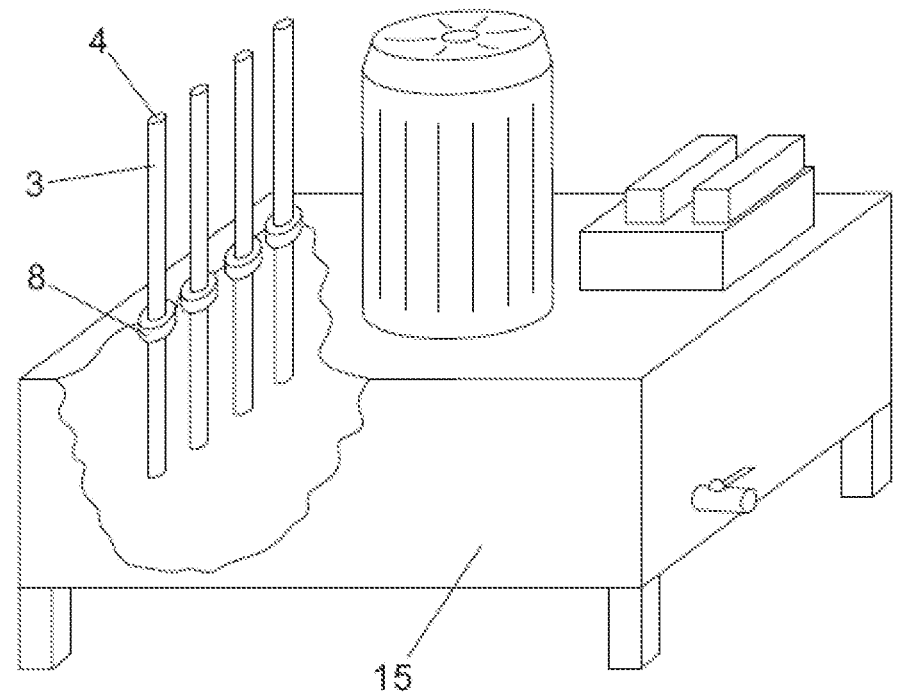

FIGS. 4A and 4B depict the cooling device applied to different components of the wind turbine.

The application of the cooling device in FIG. 4A corresponds with the diagram of FIG. 1A, where the device comprises a receptacle (2) which is connected with the component to be cooled (7), in this case, the multiplier (11) of a wind turbine. FIG. 4A shows the cooling of the multiplier (11) of a wind turbine using an intermediate receptacle (2) into which the conduits (3) are inserted, the receptacle being connected by means of ducts (9) to the mechanical pump (12) and to the return inlet of the multiplier (11) itself. The pump (12) is responsible for recirculating the primary coolant fluid (oil).

However, the application shown in FIG. 4B corresponds to the diagram of FIG. 2A since, in this case, the receptacle is the component to be cooled (7) itself, in this case, the receptacle (15) of a hydraulic unit of the wind turbine. FIG. 4B shows the cooling of the hydraulic unit of a wind turbine using the actual receptacle (15) of the hydraulic pump assembly for inserting the conduits (3) therein, and thereby discharging heat from the oil to the outside air.

Figure 5:
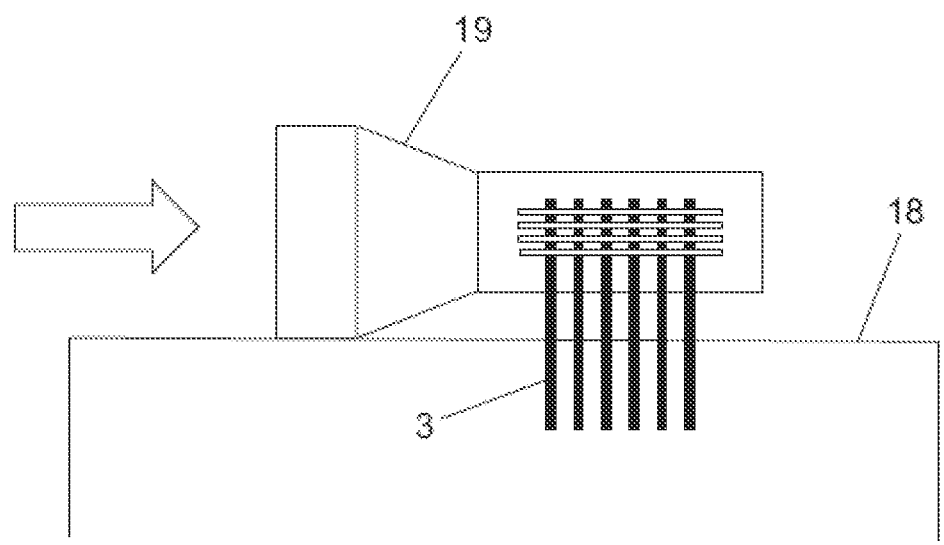
FIG. 5 depicts the possible embodiment in which a nozzle, arranged on the outside of the nacelle of the wind turbine, houses the upper portion of each conduit.

FIG. 5 shows the possible embodiment in which a nozzle (19) arranged on the outside of the nacelle (18) of the wind turbine houses the upper portion of each conduit (3). In the embodiment schematically shown in FIG. 5, the upper portion of each conduit (3) (i.e., the condensers of the conduits) projects from the roof of the nacelle (18) of the wind turbine. The condensers of the conduits are housed in a nozzle (19) generating a tunnel effect, increasing the speed of the outside air and thereby increasing system capacity. The nozzle (19) is a good complement for cooling the nacelle (18) and the compartment of the transformer, and is also useful for cooling the rest of the components of the wind turbine if the conduits (3) extend above the roof of the nacelle. This nozzle (19) takes advantage of the fact that the nacelle (18) is always oriented towards the wind when the wind turbine is working, and that when more cooling is required (i.e., when more power is generated) it is due to there being higher wind speed.

The invention claimed is:

1. A cooling device for components of wind turbines, comprising a plurality of conduits, each conduit containing therein a working fluid selected to change from a liquid to gas phase, and vice versa, during operation; wherein a first lower portion of each conduit is inserted into a receptacle through which a primary coolant fluid transporting heat from a component of a wind turbine to be cooled circulates, said lower portion acting as an evaporator of the working fluid; and wherein a second upper portion of each conduit remains outside the receptacle, acting as a condenser of the working fluid;
   wherein:
      each conduit is sealed at both ends; and
      the plurality of conduits includes a first conduit holding a first working fluid and a second conduit holding a second working fluid, wherein the first and second working fluids have different boiling points.

2. The cooling device according to claim 1, wherein the second upper portion of each conduit projects from the roof of a nacelle of the wind turbine.

3. The cooling device according to claim 2, further comprising a nozzle responsible for housing the upper portion of each conduit and increasing the speed of the outer fluid.

4. A cooling device for components of wind turbines, comprising a plurality of conduits, each conduit containing therein a working fluid selected to change from a liquid to gas phase, and vice versa, during operation; wherein a first lower portion of each conduit is inserted into a component of a wind turbine through which a primary coolant fluid transporting heat circulates, said lower portion acting as an evaporator of the working fluid; and wherein a second upper portion of each conduit remains outside the component of the wind turbine, acting as a condenser of the working fluid;
   wherein:
      each conduit is sealed at both ends; and
      the plurality of conduits includes a first conduit holding a first working fluid and a second conduit holding a second working fluid, wherein the first and second working fluids have different boiling points.

5. The cooling device according to claim 1, wherein the receptacle connected to the component of the wind turbine to be cooled comprises a recirculation pump for recirculating the primary coolant fluid.

6. The cooling device according to claim 5, wherein the component of the wind turbine to be cooled is any one of the following:
   a generator of the wind turbine;
   a multiplier of the wind turbine;
   a transformer of the wind turbine;
   control electronics of a power converter of the wind turbine.

7. The cooling device according to claim 5, further comprising ducts through which the primary coolant fluid circulates from and to the receptacle and the component of the wind turbine to be cooled.

8. The cooling device according to claim 1, further comprising at least one hermetic seal to assure leak-tightness between the receptacle and each conduit.

9. The cooling device according to claim 8, wherein the hermetic seal is flexible.

10. The cooling device according to claim 1, wherein the first lower portion of each conduit extends, forming a chamber common to the plurality of conduits.

11. The cooling device according to claim 1, wherein the second upper portion of each conduit extends, forming a chamber common to the plurality of conduits.

12. The cooling device according to claim 1, wherein each conduit is sealed at one end.

13. The cooling device according to claim 1, wherein the working fluid inside each conduit is subjected to a pressure greater than an atmospheric pressure.

14. The cooling device according to claim 1, wherein a plurality of fins is coupled to the second portion of each conduit.

15. The cooling device according to claim 14, wherein the plurality of fins include an upper seal of each conduit.

16. The cooling device according to claim 14, wherein the plurality of fins includes metal fins.

17. The cooling device according to claim 1, wherein each conduit is tubular.

18. The cooling device according to claim 1, wherein the component to be cooled is a component of an onshore, offshore, or underwater wind turbine.

19. The cooling device according to claim 1, wherein the each conduit comprises end segments made of a metal material and an intermediate segment made of a flexible and electrically insulating material.

20. The cooling device according to claim 1, wherein a plurality of fins is coupled to the first lower portion of each conduit.

21. The cooling device according to claim 4, wherein the component of the wind turbine is any one of the following:
   a nacelle of the wind turbine;
   a compartment of a transformer of the wind turbine;
   a receptacle of a hydraulic unit of the wind turbine;
   ducts through which the primary coolant fluid circulates.

* * * * *